United States Patent [19]

De Long

[11] 4,336,633
[45] Jun. 29, 1982

[54] POULTRY PROCESSING METHOD AND APPARATUS

[76] Inventor: Horace J. De Long, Rte. 6, Garrison Rd., Box 257A, Macon, Ga. 31201

[21] Appl. No.: 68,204

[22] Filed: Aug. 20, 1979

[51] Int. Cl.³ .......................... A22B 3/06; A22C 21/00
[52] U.S. Cl. .......................................... 17/51; 17/12; 17/52
[58] Field of Search .............................. 17/12, 51, 52

[56] References Cited

U.S. PATENT DOCUMENTS

| | | | |
|---|---|---|---|
| 3,243,842 | 4/1966 | Norwood | 17/45 |
| 3,490,092 | 1/1970 | Harrison | 17/12 X |
| 3,765,055 | 10/1973 | Lewis | 17/12 |
| 4,257,143 | 3/1981 | Lewis | 17/12 |

Primary Examiner—Willie G. Abercrombie
Attorney, Agent, or Firm—Jones, Thomas & Askew

[57] ABSTRACT

As a series of birds are conveyed in a suspended, inverted attitude through a poultry processing plant the neck of each bird is received in a rotating helical rotor formed by a pair of helical bars arranged in overlapping, coaxial relationship and which form a helical path therebetween. The helical rotor is rotated in timed relationship with respect to the bird conveyor so as to progressively grasp and move the heads of the birds with the conveyor. The feathers at the neck of each bird are wiped across the length of the neck, and the jugular vein of each bird is severed without severing the spinal cord or trachea of the bird.

17 Claims, 11 Drawing Figures

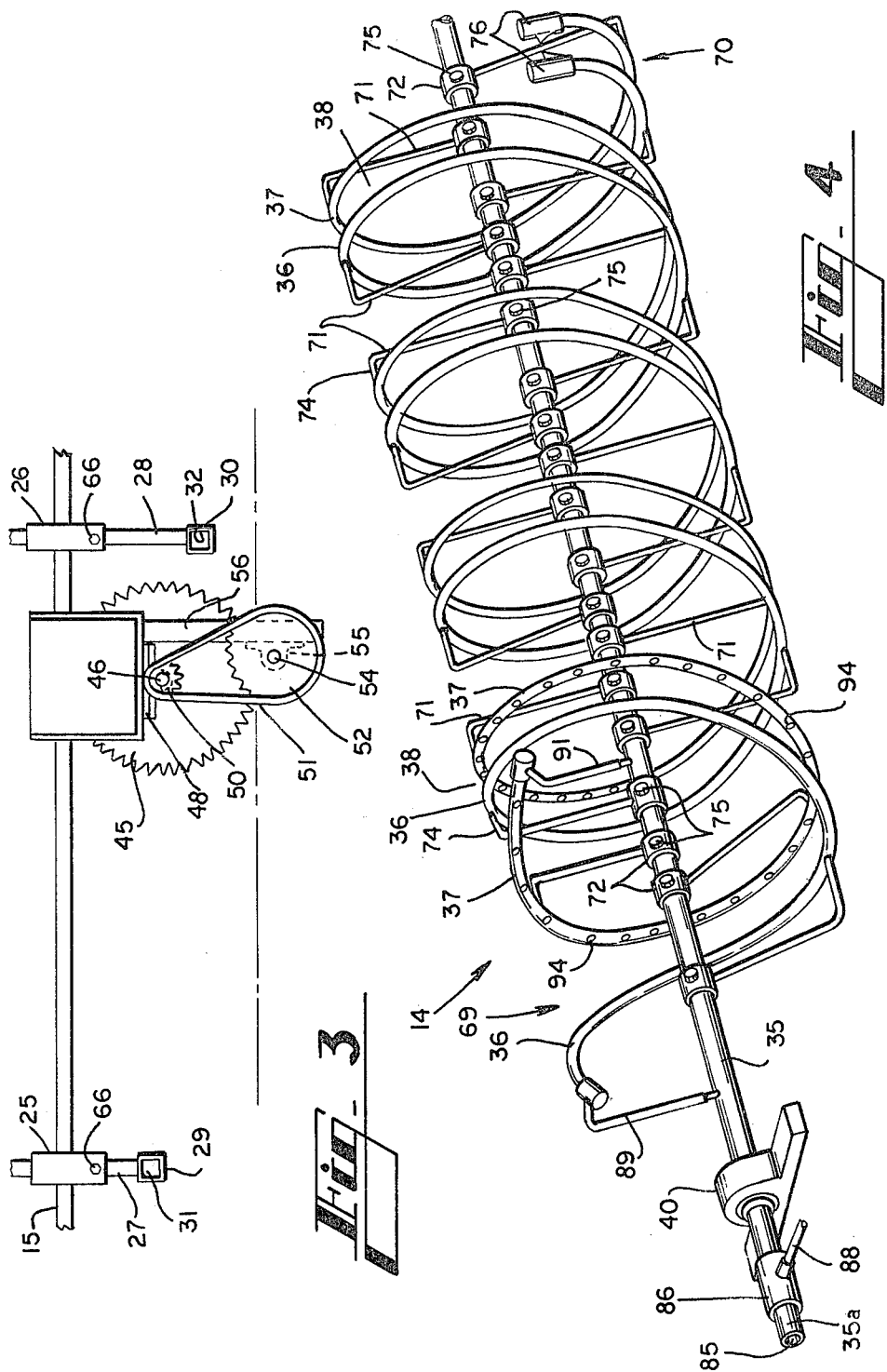

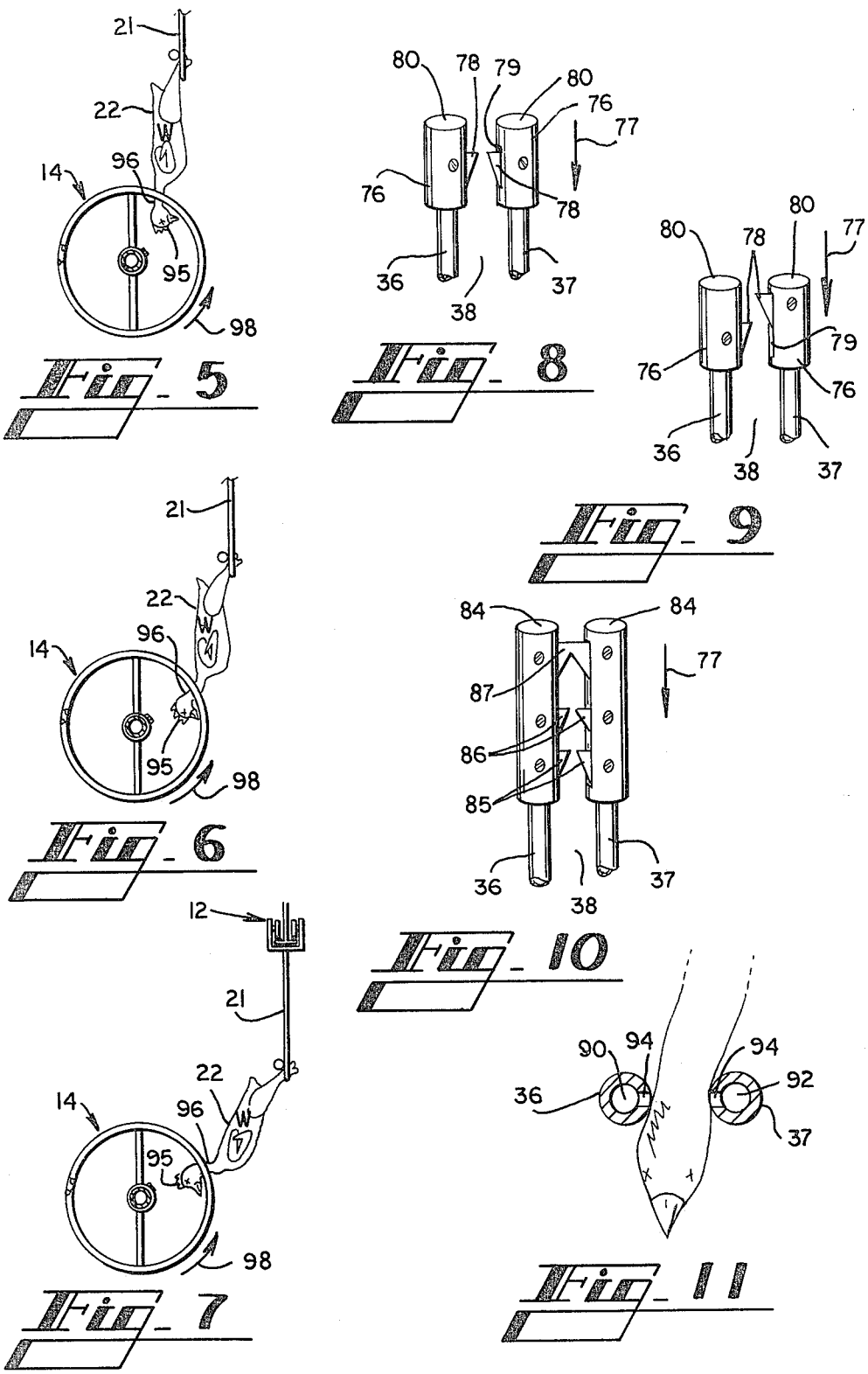

POULTRY PROCESSING METHOD AND APPARATUS

BACKGROUND OF THE DISCLOSURE

In modern poultry processing plants the poultry or birds are conveyed through the plants in equally spaced relationship on an overhead conveyor in an inverted attitude, with the birds suspended from the conveyor by their feet or hocks. The birds move on the conveyor system through various processing stations where they are stunned, killed, scalded, defeathered, eviscerated, etc.

In the process of killing the birds, it is desirable to cut the jugular vein of each bird without severing the spinal cord or trachea so that the birds tend to bleed to death. With this procedure, the heart of the bird tends to pump the blood from the body of the bird. If the spinal cord is inadvertently severed during the killing procedure, the heart of the bird stops its function and/or the bird is likely to have spasms so as to inhibit further processing of the bird until the spasms subside. If the trachea of the bird should be severed, the blood of the bird is likely to choke the bird before the bird bleeds to death. Thus, it is important to orient the head and neck of the bird during the cutting procedure in order that the neck tissue and jugular vein of the bird be severed without damaging the spinal cord and trachea.

Since the necks and heads of the birds on an overhead conveyor are suspended beneath the bird as the birds move through the processing plant, it is difficult to control the exact positions of the heads and necks because of the differences in size, weight and configuration of each bird and because the conveyor system tends to swing and twist the birds during movement through the processing plant.

SUMMARY OF THE INVENTION

Briefly described, the present invention comprises a poultry processing method and apparatus wherein as birds are conveyed in an inverted attitude in series through a poultry processing plant, the necks and heads of the birds are grasped and conveyed in timed relationship with the conveyor line, the heads are oriented, and the jugular veins of the birds are severed without severing the trachea and spinal cord of the birds. The necks of the birds are gently stretched so that the neck of each bird is grasped adjacent the skull of the bird and the cut in the neck is formed adjacent the skull.

A helical rotor comprises a pair of helical bars arranged in overlapping, coaxial relationship and form an open ended helical path positioned beneath the conveyor line, and the helical rotor is driven by the conveyor line, in timed relationship with the conveyor line. The necks and heads of the birds are received in the open ended helical path formed by the helical bars, and the helical rotor moves the necks and heads of the birds in timed relationship with respect to the movement of the birds on the conveyor system. Cutting means are mounted on the helical rotor, and after the heads and necks have been received in the helical rotor and the head properly oriented therein, the cutting means sever the opposite sides of the neck of each bird adjacent the skull, thereby cutting the jugular vein without cutting the spinal cord and/or trachea of the bird.

In one embodiment of the invention at least one of the helical bars includes a fluid passage therealong with openings extending from the fluid passage into the helical path formed by the helical bars, and means are provided for inducing a flow of fluid through the fluid passage and openings. With this structure steam, water or other fluids can be applied to the helical bars and to the necks of the birds during the process.

In another embodiment of the invention the helical rotor is equipped with cutting means which decapitates the birds.

Thus, it is an object of this invention to provide an improved poultry processing method and apparatus which accurately positions the necks and heads of birds moving along an overhead conveyor system and then severs the jugular veins of the birds without severing the trachea or spinal cord.

Another object of this invention is to provide apparatus for grasping and controlling the neck and head portion of each bird on an overhead conveyor system of a poultry processing plant so that the neck and head portions of each bird can be expediently and accurately treated, as by severing the jugular vein of the bird or decapitating the bird.

Another object of this invention is to provide a method and apparatus for reliably controlling and treating the neck and heads of poultry as the poultry is conveyed through a processing plant in an inverted attitude.

Other objects, features and advantages of the present invention will become apparent upon reading the following specification, when taken in conjunction with the accompanying drawings.

BRIEF DESCRIPTION OF THE DRAWINGS

FIG. 3 is a top view of the conveyor rail of the overhead conveyor system and the support frame and drive for the rotor bar.

FIG. 4 is a perspective illustration of the helical rotor structure.

FIGS. 5, 6 and 7 are schematic end views of the helical rotor, showing the manner in which the birds are introduced into and grasped by the helical rotor.

FIGS. 8, 9 and 10 are detail illustrations of the cutting means mounted on the helical rotor structure.

FIG. 11 is a cross sectional illustration of the helical bars of the helical rotor structure, taken along lines 10—10 of FIG. 5, and illustrating the position of a bird's neck and head as the bird is conveyed by the rotor structure.

DETAILED DESCRIPTION

Figure 1:
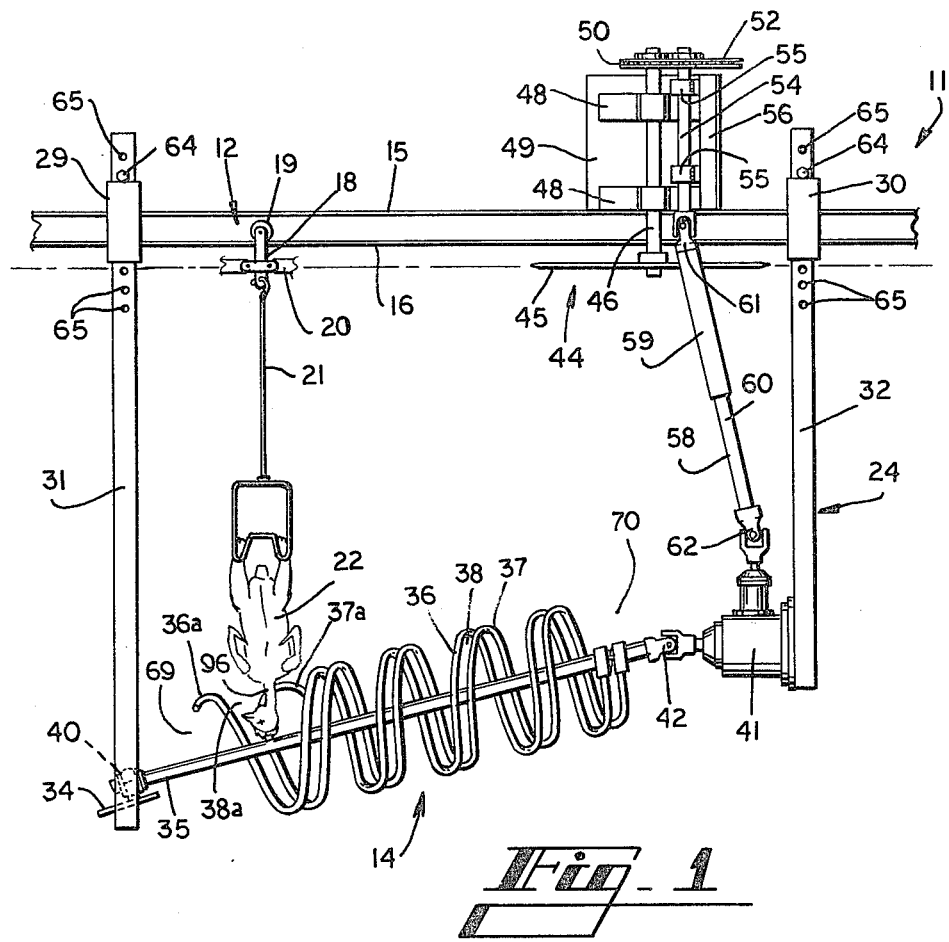
FIG. 1 is a side elevational view of the poultry processing apparatus, showing the overhead conveyor system and the helical rotor.

Referring now in more detail to the drawings, in which like numerals indicate like parts throughout the several views, FIG. 1 illustrates the poultry processing apparatus 11 which comprises an overhead conveyor system 12 and a helical rotor 14. The overhead conveyor system 12 includes horizontal rail 15 that includes a lower laterally protruding flange 16, a plurality of trolleys 18 (only one illustrated) mounted on rail 15 with the wheels 19 of the trolleys moving along the lower flange 16 of the rail. Conveyor chain 20 is connected to each trolley 18 and functions to pull each trolley along the rail throughout the poultry processing plant in a conventional arrangement. A bird support carrier or shackle 21 is mounted on each trolley 18, and the poultry or birds 22 are suspended in the shackles 21. This is conventional in the prior art.

Helical rotor 14 is suspended beneath overhead conveyor system 12 by means of adjustable support frame 24. Tubular supports 25 and 26 (FIG. 3) are mounted on the upper surface of conveyor rail 15 and extend horizontally across the length of the conveyor rail. Horizontal supports 27 and 28 are telescopically received in tubular supports 25 and 26, and vertical tubular supports 29 and 30 are rigidly mounted on the ends of horizontal supports 27 and 28. Stanchions 31 and 32 (FIG. 1) are telescopically received in vertical tubular supports 29 and 30. Support platform 34 (FIGS. 1 and 2) is rigidly mounted to the lower end of stanchion 31. Helical rotor 14 includes axle 35 and a pair of helical bars 36 and 37 in coaxial, overlapping relationship which form an open ended helical path 38 therebetween. Axle 35 is rotatably mounted at one of its ends and bearing structure 40 on platform 34. Gear box 41 is rigidly connected to the lower end of stanchion 32, and axle 35 of helical rotor 14 is rotatably supported by the universal joint 42 of gear box 41.

Rotor drive assembly 44 includes drive sprocket 45 that has peripheral teeth in engagement with the links of conveyor chain 20, sprocket shaft 46 mounted in bearings 48 on platform 49, and upper drive sprocket 50 also attached to sprocket shaft 46. Endless chain 51 (FIG. 3) extends about upper drive sprocket 50 and about upper driven sprocket 52. Upper driven sprocket 52 is rotatably mounted on sprocket shaft 54 mounted in bearings 55 to platform 56. Drive shaft 58 includes upper and lower telescoping elements 59 and 60, and the upper telescoping element 59 is connected to sprocket shaft 54 by means of universal joint 61 while the lower telescoping element 60 is connected to gear box 41 by its universal joint 62. Rotor drive assembly 44 rotates helical rotor 14 in response to the movement of conveyor chain 20, so that the angular velocity of helical rotor 14 corresponds to the linear velocity of conveyor chain 20.

Figure 2:
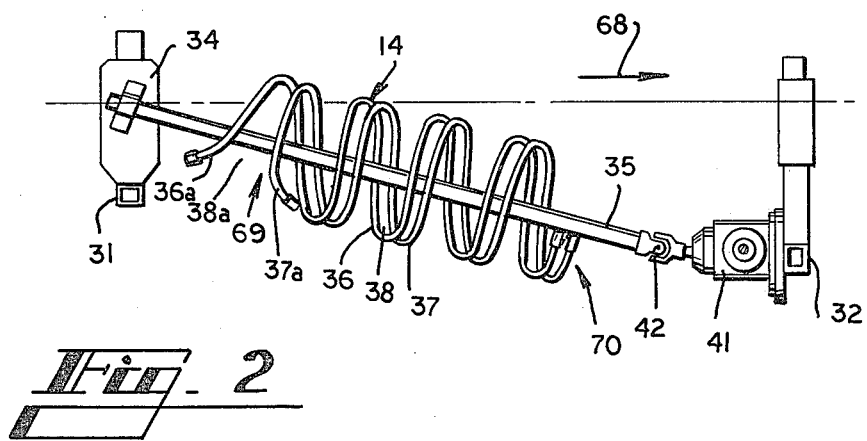
FIG. 2 is a top view of the helical rotor structure.

The height and attitude of helical rotor 14 is adjustable. The stanchions 31 and 32 can be raised or lowered through their vertical tubular supports 29 or 30 and a support pin or other fastening means 64 is insertable through openings 65 through the stanchion, so that the pin 64 can rest on the vertical tubular supports 29. Likewise, the horizontal supports 27 and 28 can be moved through their tubular supports 25 and 26 and a set screw or other fastening means 66 can be used to hold the elements together. Usually, the helical rotor 14 will be oriented as illustrated in FIGS. 1 and 2, with the axle 35 angled upwardly from support plate 34 toward gear box 41 (FIG. 1) and extending from beneath the conveyor line and angled outwardly therefrom (FIG. 2). Thus, when the direction of travel of the poultry on the conveyor line is in the direction indicated by arrow 68, the entrance end of the helical rotor 14 is at 69 and the exit end of the helical rotor is at 70.

As illustrated in more detail in FIG. 4, the helical bars 36 and 37 are supported from axle 35 by a plurality of radial support struts 71. Each support strut 71 is mounted at its inner end to strut socket 72, and the strut sockets 72 are telescopically mounted on axle 35. The outer end of each radial support strut 71 is L-shaped, with its horizontal leg 74 connected at its end to a helical bar 36 or 37. Set screws or other fasteners 75 hold each strut socket 72 in a fixed position on axle 35. When the set screws 75 are all loosened, the helical bars 36 and 37 can be moved axially and rotatably with respect to axle 35, so as to properly position the helical bars 36 and 37 with respect to each other and to adjust the width of the open ended helical path 38 that is formed between the helical bars 36 and 37. When the set screws are tightened, the helical bars 36 and 37 remain stationary with respect to the axle 35. With this arrangement, the space between the helical bars 36 and 37 can be adjusted to receive larger or smaller necks of the fowl being processed in the poultry processing apparatus 11, and helical bar 36 functions as a feed bar which gathers in and moves the necks and heads of the birds along the path of the helical rotor, while the helical bar 37 functions as a guide bar to control and guide the necks and heads of the birds.

As illustrated in FIGS. 8, 9 and 10, various neck treating means can be mounted on helical bars 36 and 37. FIG. 8 illustrates cutting means 76 mounted on the ends of helical bars 36 and 37. The cutting means 36 includes a cutting blade 78 mounted in a slot 79 of a blade support sprocket 80. Each blade support sprocket 80 is rigidly mounted to the end of its helical bar 36 or 37 as by welding or by means of a set screw, and the slot 79 and blade 78 are directed inwardly toward the helical path 38 and the helical bars 36 and 37 and blades 78 move with respect to the bird in the direction indicated by arrow 77. Therefore, the cutting means 76 function as means for severing the opposite sides of the neck of a bird grasped between the helical bars 36 and 37.

As illustrated in FIG. 9, the cutting means 76 are arranged so that their blades 78 are staggered or offset with respect to each other. This staggered relationship of the blades 78 causes the opposite sides of the neck of the birds to be cut in sequence, rather than simultaneously, so that the cutting force required to make the cuts in the opposite sides of the neck are applied in sequence rather than simultaneously.

As illustrated in FIG. 10, an alternate cutting means 84 is attached to the ends of helical bars 36 and 37. This cutting means includes blades 85, 86 and 87 which progressively cut deeper into the opposite sides of the necks of the birds, with blade 87 spanning across the entire open ended helical path 38 for the purpose of decapitating the birds.

As illustrated in FIG. 4, at least the end portion 35a of axle 35 is tubular and defines a fluid passage 85 therethrough. The passage can extend the entire length of axle 35 or a portion of the length thereof. Header 86 surrounds axle 35, and fluid conduit 88 communicates with header 86. Axle 35 includes at least one opening therethrough (not shown) that communicates the interior portion of header 86 with the fluid passage 85 of the axle, so that fluid can pass along the length of axle 35.

Branch conduit 89 communicates at one of its ends with fluid passage 85 of axle 35, and the other end of branch conduit 89 communicates with an end of helical bar 36. Helical bar 36 is also fabricated from tubular stock and defines a fluid passage 90 (FIG. 11) extending therethrough. A similar branch conduit 91 is connected between axle 35 and the other helical bar 37, and helical bar 37 also defines a fluid passage 92 (FIG. 11) extending therethrough. A plurality of fluid openings 94 are formed at spaced intervals along helical bars 36 and 37 and communicate with fluid passages 90 and 92. Thus, fluid, such as hot water, steam or other fluids, can be moved through fluid conduit 88, header 86, branch conduits 89 and 91 and out of the openings 94 in the helical bars 36 and 37. The openings 94 are directed inwardly toward the open ended helical path 38 formed between the helical bars 36 and 37, so that the fluid is directed toward the necks of the birds being processed. Also, the fluid tends to wet the surfaces of each helical bar 36 and 37 so as to lubricate the surfaces of the bars.

As illustrated in FIGS. 1, 2, 5, 6 and 7, the birds 22 are conveyed on the overhead conveyor system 12 by their shackles 21 and to the entrance end 69 of the helical rotor 14. Since the entrance end 69 (FIGS. 1 and 2) of the helical rotor is positioned beneath the path of the overhead conveyor 12, the head 95 and necks 96 of the birds 22 will be moved into the confines of the helical bars 36 and 37. At the entrance end 69, helical bar 37 is somewhat circular in configuration so that its entrance end 37a terminates adjacent the surface of helical bar 36 and diverges away from the entrance end 36a of helical bar 36, forming an enlarged gap 38a in the open ended helical path 38. Thus, when the necks and heads of the birds approach the entrance end 69 of the helical rotor 14, the entrance end 37a of helical bar 37 prevents the necks and heads from inadvertently missing the open ended helical path 38. The enlarged gap 38a therefore receives the neck 96 of each bird and progressively closes about the neck until the neck is securely grasped by the helical bars 36 and 37 in the open ended helical path 38.

The helical rotor 14 rotates in the direction indicated by arrow 98 (FIGS. 5-7) so that as the helical bars 36 and 37 frictionally engage the sides of the necks of the birds 22, there is a lifting action on the necks of the birds. Because the helical rotor 14 is angled upwardly and laterally with respect to the conveyor path 68, the birds 22 move downwardly and laterally with respect to the helical rotor 14 whereupon the neck is received in the portion of the helical rotor that is moving in an upward direction. This causes more lifting action to be applied to the necks and heads of the birds as they progress further through the helical rotor 14, and the weight W of the birds tend to hold the body of the bird extending downwardly from its shackle 21. Thus, the neck of each bird tends to be stretched and lifted upwardly against the weight of the bird until the head 95 seeks a position with respect to the helical rotor (FIG. 7). By the time the birds reach the position indicated in FIG. 7, the long axis of the heads of each bird will be oriented parallel to the open ended helical path, which is approximately across the direction of movement of the birds along the conveyor path 68. As the birds 22 move further through the helical rotor 14, the heads 95 of the birds become more securely seated between the helical bars 36 and 37, and by the time the birds reach the exit end 70 of the helical rotor 14, the cutting means 76 or other processing means will receive the necks and heads of the birds in a predetermined position, so that the opposite sides of the necks of the birds will be severed etc. When cutting means 76 of the type illustrated in FIGS. 8 and 9 are used, the opposite sides of the necks are severed so as to cut the jugular vein of the birds without cutting the trachea or spinal cord.

The helical bars 36 and 37 preferably are formed with a pitch so that the advancement of the helical path 38 formed by the bars 36 and 37 on each 360° rotation is equal to the space between adjacent ones of the shackles 21 of the conveyor system. Thus, a multiple number of birds will be received simultaneously in the helical rotor 14. In the illustrated embodiment, the diameter of the helical bars 36 and 37 is one foot and the length of the helical bars is approximately three feet. These dimensions can be modified in accordance with the type birds being processed; however, for a given pitch and rotational velocity, a larger diameter of the rotor increases the circumferential velocity of the helical bars and therefore increases the impact of the cutting means on the necks of the birds, which enables the cutting means to cut more effectively.

As the necks of the birds are grasped and moved through the helical bars 36 and 37, the friction of the helical bars against the necks of the birds tends to wipe the feathers at the neck across the length of the neck. This effectively moves the feathers out of the way of the cutting means, so that the cutting means do not have to cut through so many feathers as it cuts into the necks of the birds. Therefore, the knives and other cutting means tend to remain sharper for a longer period of time and the impact required by the cutting means against the necks of the birds in order to effectively cut the necks is reduced.

The guide bars 36 and 37 grasp the necks of the birds immediately adjacent the skull of the bird, and the cutting means of FIG. 10 which decapitate the bird are arranged to cut through the neck tissue adjacent the portion of the esophagus and trachea that are connected together, so that the esophagus and trachea left in the body of the bird are not connected together and can be expediently removed from the carcus of the bird in a later operation.

While this invention has been described in detail with particular reference to a preferred embodiment thereof, it will be understood that variations and modifications can be effected within the spirit and scope of the invention as described hereinbefore and as defined in the appended claims.

I claim:

1. In a poultry processing system wherein a plurality of birds are suspended in an inverted attitude and moved in a series along a processing path by a conveyor through a plurality of processing steps, the improvement comprising wiping the neck feathers on opposite sides of the neck of each bird in a direction extending laterally across the length of the neck of each bird in a direction transverse to the processing path as the birds move along the processing path to move the feathers out of the way of a cutting means, and cutting with a cutting means through the skin and tissue of the neck on opposite sides of the neck at the areas of the neck where the feathers have been wiped with a motion laterally transverse to the processing path.

2. The process of claim 1 and wherein the step of wiping the neck feathers on opposite sides of the neck of each bird includes lifting the neck of the bird and stretching the neck of the bird with the wiping motion.

3. In a poultry processing system wherein a plurality of birds are suspended in an inverted attitude and moved in series by a conveyor through a plurality of processing steps, the improvement comprising grasping the neck of each bird adjacent its skull, lifting and wiping the sides of the neck of each bird against the weight of the body of the bird in a direction across the length of the neck and across the direction of travel of each bird to stretch the neck of the bird and to move the feathers at the sides of the neck out of the way of a cutting means, and cutting the neck of each bird with a cutting means while the neck is lifted and stretched and while the feathers have been moved out of the way of the cutting means.

4. The process of claim 3 and further including the step of wetting the neck feathers of each bird which have been wiped as the neck of the bird is lifted against the weight of the body of the bird.

5. In a poultry processing system wherein a plurality of birds are suspended in an inverted attitude and conveyed in a series through a plurality of processing steps, the improvement comprising moving the neck portion of each bird in series into engagement with a helical rotary element including a pair of coaxial overlapping helical screw elements extending about a common central axis and defining a helical slot therebetween so that the neck of each bird extends through the slot with the head of each bird on one side of the screw elements adjacent the central axis of the screw elements and the body of each bird on the other side of the screw elements, rotating the rotary element about the central axis of the screw elements to urge the necks of the birds in sequence along the length of the rotary element, and treating the neck of each bird with the rotary element as the birds move along the length of the rotary element.

6. The process of claim 5 and further including moving water into and through a portion of at least one of said screw elements and out of the screw element to wet the screw element and the necks of the birds passing through the helical slot formed by the screw elements.

7. The process of claim 5 wherein the step of treating the neck of each bird comprises cutting through the skin and flesh of the neck of each bird with a knife element mounted on the screw element.

8. The process of claim 5 and wherein the step of treating the neck of each bird comprises cutting through the skin and flesh on opposite sides of the neck of each bird with knife elements mounted on each of the screw elements.

9. The process of claim 5 and wherein the step of treating the neck of each bird comprises decapitating each bird at a position on the neck adjacent the connection of the esophagus and the trachea.

10. The process of claim 5 and wherein the step of moving the neck portion of each bird in series into engagement with a helical rotary element comprises moving the birds along a path disposed at an angle with respect to the longitudinal axis of the helical screw elements, and further including the step of lifting the neck of each bird with the helical screw elements.

11. The process of claim 5 and further including the step of orienting the head of each bird so that the longer axis of each head is coextensive with the helical slot of the rotary element.

12. A method of killing poultry comprising the steps of moving a plurality of birds in series in an inverted attitude along a path, grasping the neck of each bird on opposite sides of the neck adjacent its head and progressively lifting the neck and head of each bird laterally from beneath the path as the birds move along the path to stretch the neck of each bird against the weight of the body of each bird, orienting the head of each bird so that its longer dimension extends across the direction of travel of the bird along the path, moving a cutting means in a direction laterally transverse to the direction of travel of the bird along the path, and engaging the neck of each bird with the cutting means at the locations on the neck where the neck is grasped and lifted so as to sever opposite sides of the neck and the jugular vein of the bird without severing the trachea or spinal cord of the bird.

13. The method of claim 12 and wherein the step of grasping the neck of each bird includes wiping the feathers of the neck of each bird in a direction across the length of the neck, and applying liquid directly to the areas of the neck of each bird being wiped.

14. In a poultry processing system wherein a plurality of birds are suspended in an inverted attitude and moved in series along a path by a conveyor through a plurality of processing steps, the improvement comprising inserting the neck of each bird between a pair of bars arranged in side-by-side helical configuration and spaced from each other along their lengths a distance less than the width of the head of the bird with the head of the bird positioned on one side of the bars and with the rest of the body of the bird positioned on the other side of the bars, rotating the helically formed bars about their longitudinal axis at a rotational velocity which tends to move the neck of the bird at a velocity corresponding to the velocity at which the rest of the body of the bird is moved by the conveyor, and treating the neck of the bird as the neck of the bird is moved by the pair of helical bars.

15. The poultry processing system of claim 14 and wherein the step of rotating the helically formed bars about their longitudinal axis comprises rotating the helically formed bars about an axis that is inclined upwardly with respect to the conveyor path and that diverges laterally out from beneath the conveyor path, and rotating the helically formed bars in a direction that tends to lift the neck of the bird and urge the neck of the bird laterally and upwardly with respect to the conveyor path.

16. The poultry processing system of claim 14 and wherein the pair of bars are tubular, and further including the step of inducing a flow of fluid through the tubular bars.

17. A method of killing poultry comprising the steps of moving a plurality of birds in series in an inverted attitude along a path, grasping the neck of each bird by inserting the neck of each bird between a pair of overlapping coaxial helical bars, rotating the helical bars at an angular velocity corresponding to the rate of movement of the birds along the path, orienting the head of each bird so that its longer dimension extends across the direction of travel of the bird along the path, engaging the neck of each bird with a cutting means at the location on the neck where the neck is grasped so as to sever the jugular vein of the bird without severing the trachea or spinal cord of the bird.

* * * * *